UNITED STATES PATENT OFFICE.

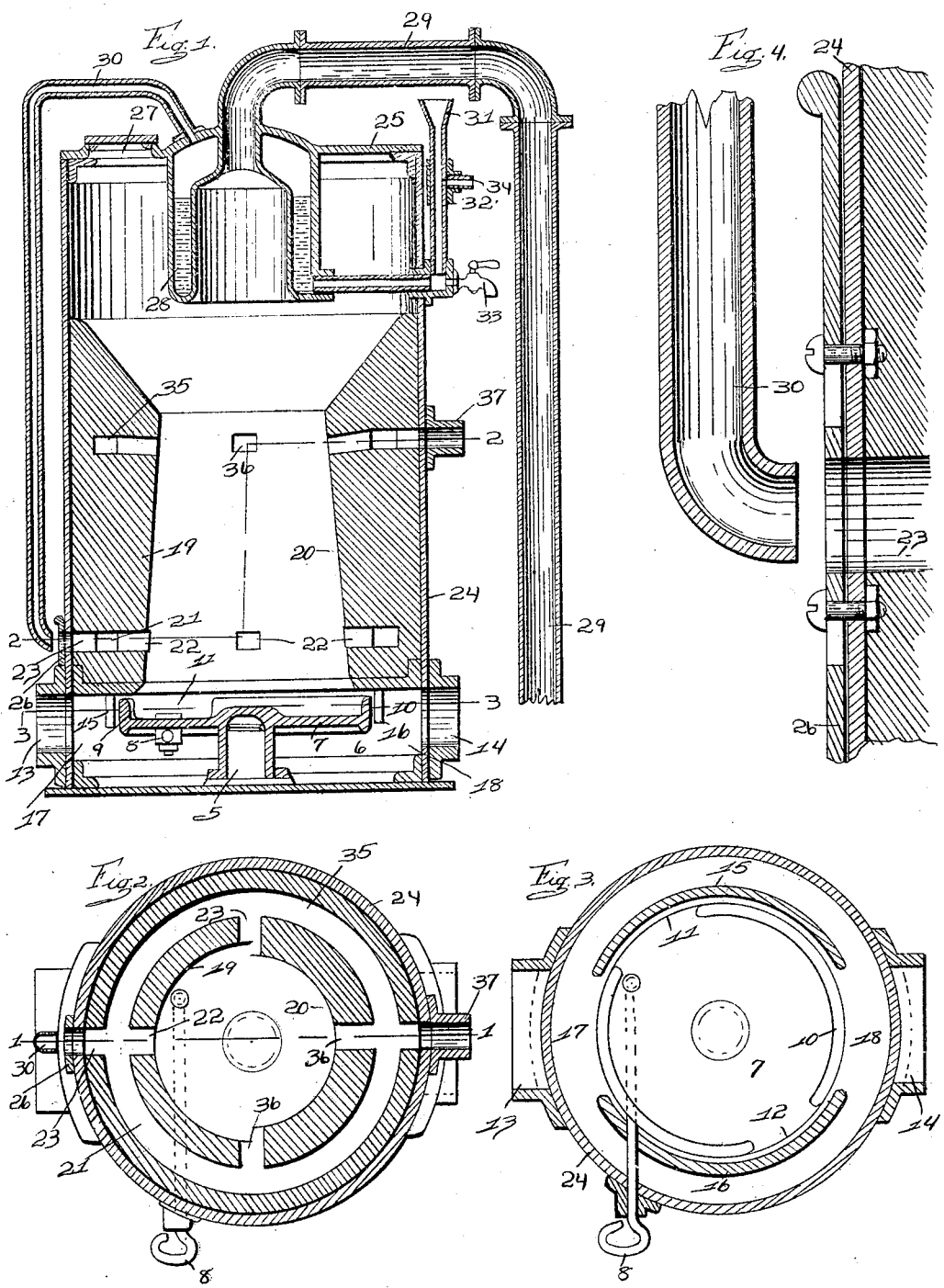

EDWARD KRENZ, OF ST. LOUIS, MISSOURI.

GAS-PRODUCER.

No. 804,814.  Specification of Letters Patent.  Patented Nov. 14, 1905.

Original application filed July 23, 1904, Serial No. 217,772. Divided and this application filed December 10, 1904. Serial No. 236,333.

*To all whom it may concern:*

Be it known that I, EDWARD KRENZ, a citizen of the United States, and a resident of St. Louis, Missouri, have invented certain new and useful Improvements in Suction Gas-Producers, of which the following is a specification, containing a full, clear, and exact description, reference being had to the accompanying drawings, forming a part hereof.

This application is a division of my prior application filed July 23, 1904, Serial No. 217,772.

My invention relates to improvements in suction gas-producers; and it consists of the novel features herein shown, described, and claimed.

In the drawings, Figure 1 is a vertical central section on the line 1 1 of Fig. 2. Fig. 2 is a horizontal section on the line 2 2 of Fig. 1. Fig. 3 is a horizontal section on the line 3 3 of Fig. 1. Fig. 4 is a sectional detail on the same line as Fig. 1, upon an enlarged scale, showing the regulation of the air-inlet, the other parts being broken away to economize space.

Referring to the drawings in detail, the pedestal 5 is mounted vertically at the center of the ash-pit 6, and the imperforate fire-pot bottom 7 is mounted upon the pedestal. A handle 8 is attached to the bottom of the fire-pot bottom and extends outwardly through the wall, to be used in shaking the fire-pot bottom. Flanges 9 and 10 extend upwardly from the fire-pot bottom, there being openings 11 and 12 between the ends of the flanges, said openings being in transverse alinement, and there being openings 13 and 14 leading into the ash-pit, so that when the handle 8 is pulled outwardly the openings 11, 12, 13, and 14 are all in alinement. Flanges 15 and 16 extend downwardly from the body of the fire-pot outside of the flanges 9 and 10, there being openings 17 and 18 between the ends of the flanges 15 and 16 in alinement with the openings 13 and 14, so that when the handle 8 is shoved inwardly the flanges 15 and 16 close the openings 11 and 12 and prevent the fire and ashes from falling from the fire-pot into the ash-pit.

The body 19 of the fire-pot is constructed of fire-brick, the fire-pot chamber 20 being circular in plan and directly above the bottom 7. An air-distributing chamber 21 is formed in the fire-brick near the bottom and extends entirely around the fire-pot, there being openings 22 leading from the chamber into the fire-pot and there being an opening 23 leading from the open air into the chamber. A metal casing 24 surrounds the fire-brick and extends upwardly a considerable distance above the fire-brick, and a top 25 closes the upper end of this casing. The air-inlet opening 23 extends through the casing 24, and a slide 26 controls the passage of air through the inlet-opening. An opening 27 in the top 25 provides means for inserting fuel into the fire-pot, said opening being controlled by a suitable removable cover. A water-pot 28 depends from the top 25 directly above the fire-pot, and a permanently open smoke-flue 29 leads from the fire-pot upwardly through the water-pot to the smoke-stack. A steam-pipe 30 leads from the water-pot 28 outwardly and downwardly and blows into the air-inlet 23. A funnel 31 is mounted in position above the level of the water-pot, and a pipe 32 connects said funnel to the bottom of the water-pot. A faucet 33 is attached in the lower part of the pipe 32 to provide means for drawing the water out of the water-pot, and an overflow-pipe 34 is attached in the vertical part of the pipe 32 at a point to limit the rise of the water in the water-pot so as to prevent filling the water-pot too full and so as to prevent the overflow from the water-pot passing through the pipe 30. A gas-collecting chamber 35 is formed in the upper part of the fire-pot 19, there being passages 36 leading from the upper part of the fire-pot to said chamber and there being an outlet 37 leading from the chamber outwardly through the wall.

The generators heretofore produced have been constructed principally for the use of anthracite coal, and these generators could not be used with soft coal, lignite, and other inferior fuel. It is the principal object of my invention to provide means for using an inferior grade of coal.

In the operation of the apparatus shown and described I kindle a fire upon the fire-pot bottom 7 in the lower part of the fire-pot, and I fill the upper part of my fire-pot with the fuel to be used. The fire-pot bottom being imperforate, it is obvious that only a limited amount of air will be admitted to the fire-pot from the chamber 21, and at the first the fire will burn slowly, gradually reducing the fuel to a mass and tending toward coke and expelling the smoky properties from the fuel. The smoke will be carried off through the flue 29, and the red-hot carbon will settle in the lower part of the fire-pot. During this time the water in the water-pot 28 will become heated, and the steam will pass through the steam-pipe 30 and blow into the air-inlet 23, thus causing a mixture of air and steam to pass into the chamber 21 and from the chamber be distributed through the openings 22 into the lower part of the fire-pot, and this mixture of air and steam will pass through this red-hot mass and pass upwardly into the gas-collecting chamber 35, as indicated by the arrows in Fig. 1, and by any suitable means this gas will be sucked through the outlet 37 and disposed of as desired. The mixture of steam and air will be forced into the chamber 21 by the resistance of the fuel within the fire-pot. The top of the red-hot mass of fuel will be above the gas-chamber 35, so that the gas sucked into and out of the gas-chamber will be pure and so that the foul gases and smoke will pass outwardly through the flue 29 and not contaminate the gas which is to be used. The force of the suction of the gas through the outlet 37 must be properly regulated relative to the force of the draft through the pipe 29 so as to separate the smoke from the gas. If either force is too strong, both the pure and impure gas will be carried in the direction of the stronger force.

If it is desired to produce gas for the operation of a gas-engine, the engine will be connected directly to the outlet-pipe 37, and as the engine operates it will secure its charges directly from the red-hot mass in the fire-pot.

In starting the fire the amount of draft may be regulated by operating the handle 8 to open the openings 11 and 12, and the cinders and ashes may be removed by inserting a draw-rod through the openings 13 and 14 and through the openings 11 and 12. As the fire progresses a layer of ashes and cinders will accumulate upon the fire-top bottom and produce an insulation, which will prevent the heat from being radiated downwardly into the ash-pit.

If desired, valves may be inserted into the pipes 30 and 32, so as to increase the pressure generated in the water-pot.

What I claim is—

1. The improved suction gas-producer, comprising a fire-pot having a steam and air distributing chamber at its bottom; a fresh-fuel chamber at the top of said fire-pot; a gas-collecting chamber surrounding the top of said fire-pot; a gas-suction pipe connection in communication with said gas-collecting chamber; a steam-boiler suspended from its upper end within and inclosing within itself a portion of said fresh-fuel chamber; a permanently open smoke-pipe passing centrally through said boiler, and forming a smoke-passage therein; and a steam-pipe extending from said steam-boiler and arranged to discharge steam into said steam and air distributing chamber; substantially as specified.

2. The improved suction gas-producer, comprising a fire-pot having a steam and air distributing chamber at its bottom, a gas-collecting chamber above said fire-pot, a steam-boiler inclosing a portion of said gas-collecting chamber, a smoke-pipe connected to said gas-collecting chamber, a steam-pipe extending from said steam-boiler and arranged to discharge steam into said steam and air distributing chamber, the pedestal 5 mounted vertically at the center of the ash-pit beneath the said fire-pot, the imperforate fire-pot bottom 7 mounted upon said pedestal, the handle 8 attached to the bottom of the fire-pot bottom, and extending outwardly to be used in shaking said fire-pot bottom, flanges 9 and 10 extending upwardly from the fire-pot bottom, and having transversely-alined openings 11 and 12 between their ends, and the ash-pit having transversely-alined openings 13 and 14, substantially as specified.

In testimony whereof I have signed my name to this specification in presence of two subscribing witnesses.

EDWARD KRENZ.

Witnesses:
 ALFRED A. EICKS,
 JOHN C. HIGDON.